Jan. 2, 1934.  A. V. NIELSEN  1,941,711

SELF CLOSING VALVE

Filed Feb. 6, 1929

INVENTOR
August V. Nielsen
BY Murray O. Hayes
ATTORNEY

Patented Jan. 2, 1934

1,941,711

UNITED STATES PATENT OFFICE 1,941,711

SELF-CLOSING VALVE

August V. Nielsen, Salt Lake City, Utah

Application February 6, 1929. Serial No. 337,861

7 Claims. (Cl. 251—143)

This invention relates to a springless self-closing valve, and among its objects are:

To invent a satisfactory valve of this type;

To provide a device of the kind mentioned which will be cheap to make and not liable to get out of order;

To embody in a self-closing valve means to retard the rate of closing.

Figure 1:
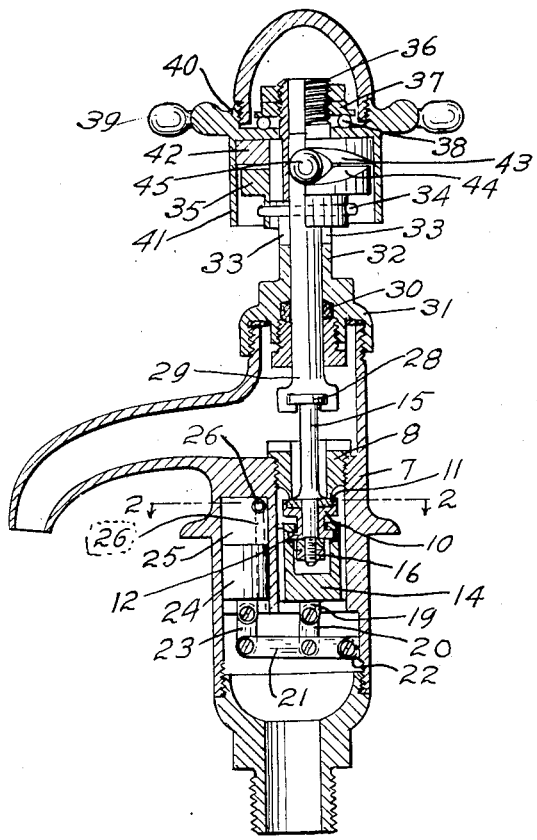
Fig. 1 is a longitudinal section of the assembled valve.
Figure 3:
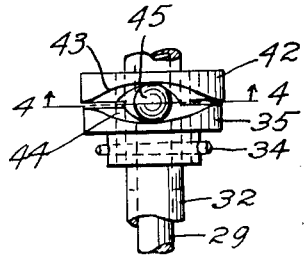
Fig. 3 is a detail view of the cam surfaces which impart longitudinal movement to the valve stem.
Figure 4:
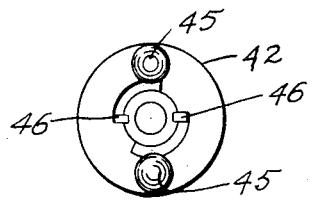
Fig. 4 is a detail view taken on line 4—4, Fig. 3, looking in the direction of the arrows.
Figure 5:
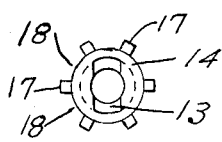
Fig. 5 is a top plan view of the valve proper.
Figure 2:
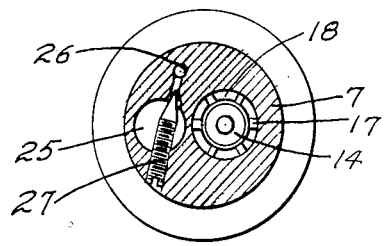
Fig. 2 is a section on the line 2—2, Fig. 1.
Figure 6:
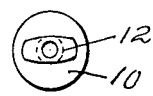
Fig. 6 is a bottom plan view of the member which connects the valve to the valve stem.

The numeral 7 designates the casing of the valve, which is internally screw threaded to receive a seat member 8, in the upper end of which is a slot to engage a screw driver. Cup member 10 carries an annulus 11 of packing material to bear against said seat; at the lower end of said cup is an elongated bar or T-head 12 adapted to pass through slot 13 in the upper end of valve 14, and then be turned through a right angle to retain said valve and said cup in operative connection. Valve stem 15 passes through said cup member and is secured thereto by nut 16 on said stem.

Valve member 14 has longitudinal ribs 17 to keep it properly positioned in the casing and leave channels 18 for the passage of fluid; at the bottom of said valve are ears 19 spaced apart to receive link 20 in pivotal connection which incidentally prevents rotation of the valve member 14; the said link is pivoted at its other end to the lever 21 which has one end pivoted to the wall of casing 7 at 22 and the other end pivotally connected to link 23 which in turn is also pivotally connected to plunger 24. The said plunger is slidable in a bore 25 into which a duct 26 opens; screw threaded in said duct is a valve 27 to vary the fluid carrying capacity of said duct; duct 26 passes down and opens into the body of casing 7.

At the upper end of stem 15 is a head 28 which engages the lower end of rod 29, shaped for that purpose; the said rod passes through the usual packing gland 30, which gland is in cap 31, the said cap being screwed upon the upper end of body 7. The cylindrical upward prolongation 32 of said cap has diametrically opposite slots 33 cut therein to receive pin 34, the said pin passing through rod 29 and engaging collar 35. The upper end of prolongation 32 is threaded at 36 to engage skirt nut 37 which serves as one member of a race to retain bearings 38. The other member of the race for said bearings is a wheel like member with radial arms 39 to be grasped in manipulating the valve.

Said wheel like member 40 has a depending cylindrical flange 41 inside of which is an annulus 42 with a cam surface 43 on the lower face thereof; on collar 35, opposite cam surface 43 is a similar surface 44, and between them is a ball 45; diametrically opposite these last mentioned parts are similar cam surfaces and a like ball between them; stops 46 are provided to prevent turning the wheel 40 so far that the balls stick between the cam surfaces and hold the valve open. An ornamental cap 47 is secured to wheel 40 to conceal and protect from dirt the parts on the upper end of extension 32.

When it is desired to open this valve, rotational force is applied to arms 39, which causes cam surface 43 to move on into contact with ball 45, whereby said ball is rolled and made to travel up surface 44; under these conditions the said surfaces must separate, and inasmuch as wheel 40 is under skirt nut 37, which in turn is fast on extension 32 and can not therefore move up, collar 35 must of necessity move down and since said collar is fixed to rod 29 by pin 34 said rod must be depressed also.

The downward movement of rod 29 is transmitted to stem 15, which moves gasket 11 away from seat 8 and permits the flow of water from the faucet; when sufficient water has been drawn it is necessary only to let go of arms 39 and the pressure of the water closes the valve.

The closing is as follows:

Pressure of the water below valve 14 forces said valve upwardly; to prevent too sudden closing thereof plunger 24 and lever 21 are connected by means of links 20 and 23 to the valve. It has been explained above that plunger 24 slides in bore 25 and that duct 26 opens into said bore; plunger 24 is thus subjected to the same pressure on both ends, but as valve 14 is moved up toward seat 8 the water that is in said bore above the plunger must be forced out through said duct, and this retards the closing of the valve so that the current is not checked instantaneously with the resultant heavy blow due to that stoppage. Screw valve 27 is provided to make the rate of closing variable. Plunger 24 is given the longer lever arm on lever 21 because the pressure on the two ends thereof is equalized whereas this is not the case on valve 14, and the former is given a mechanical advantage to offset the difference.

Due to the bearings 38 and 43 the device is extremely easy to manipulate, yet it is positive in closing; there being no springs to lose resiliency or corrode it will last indefinitely.

I claim:

1. In a self-closing valve, a casing, an outlet passage therethrough, a fluid-pressure operated closure for said passage, a stem connected to said closure, a rod connected to said stem, an elongated cap connected to said casing and lying around said rod, diametrically opposite slots in the elongation of said cap, a pin extending through said slots and said rod, a collar on said rod, said pin passing through said collar also, an upwardly facing cam surface on said collar at each opposite end of a diameter, an annulus having similar cam faces opposed to the first mentioned cam faces, a manually operable member having a depending skirt within which said annulus is disposed, balls between the cam faces of each opposed pair, a skirt nut fixed to said elongation, and antifriction means between said nut and said manually operable means.

2. In a valve, a casing, an outlet passage therethrough, a closure for said passage, said closure being adapted to be closed by fluid pressure only, a dash-pot within said casing, a plunger in said dash-pot, a lever having one end pivoted to the interior of said casing, a link connected at one end to said closure and at the other to said lever intermediate the ends of said lever, a link connected to the other end of said lever and to said plunger, a substantially cylindrical member connected to said casing, a member rotatably secured thereon, a member passing through said cylindrical member and connected to said closure, a cam face in fixed relation with said rotatable member, a collar fixed to said member connected to said closure and disposed below said rotatable member, and a ball between said collar and said rotatable member, there being an aperture through the wall of said dash-pot to connect the interior thereof with the interior of said casing.

3. In a self-closing valve, a casing, a pair of cylindrical passages formed in said casing, said passages being disposed side by side and substantially parallel to each other and said casing, one of said passages being provided with a seat, a valve member operating in said passage and cooperating with said seat, a piston operatively disposed in said other passage, said last named passage having means placing the same in fluid communication with said casing, and an operative connection coupling said valve member and said piston for movement in unison, whereby, said valve member will find its seat quietly and hydraulic shocks will be prevented.

4. In a self-closing valve, a casing, a pair of cylindrical passages formed in said casing, said passages being disposed side by side and substantially parallel to each other and said casing, one of said passages being provided with a seat, and a valve member operating in said passage and cooperating with said seat to control the flow of fluid through said passage, a piston operatively disposed in the other of said passages, said last named passage having means placing the same in fluid communication with said casing, said means comprising a third cylindrical passage formed in said casing and disposed substantially parallel to said first mentioned passages, and a transverse bore formed in said casing connecting said piston passage and said third passage, and means connecting said valve member and piston for causing them to move in unison.

5. In a self-closing valve, a casing, a pair of cylindrical passages formed in said casing, said passages being disposed side by side and substantially parallel to each other and said casing, one of said passages being provided with a seat, a valve member operating in said passage and cooperating with said seat to control the flow of fluid through said passage, a piston operatively disposed in the other of said passages, said last named passage having means associated therewith placing the same in fluid communication with said casing, and means connecting said valve member and piston for causing them to move in unison, said last named means causing a greater travel of said piston than a given travel of said valve member.

6. In a self-closing valve, a casing, a pair of cylindrical passages formed in said casing, said passages being disposed side by side and substantially parallel to each other and said casing, one of said passages being provided with a seat, a valve member operating in said passage and cooperating with said seat to control the flow of fluid through said passage, a piston operatively disposed in the other of said passages, said last named passage having means associated therewith placing the same in fluid communication with said casing, and means connecting said valve member and piston for causing them to move in unison, said last named means causing a greater travel of said piston than a given travel of said valve member, and comprising a lever pivoted at one of its ends in the inner wall of said casing, and having the other end thereof projecting across the ends of said passages and connected to said piston, the central portion of said lever being operatively connected to said valve member.

7. In a self-closing valve, a casing, a pair of cylindrical passages formed in said casing, said passages being disposed side by side and substantially parallel to each other and said casing, one of said passages being provided with a seat, a valve member operating in said passage and cooperating with said seat, said valve member having a T-head projecting from one face thereof, a piston operatively disposed in the other of said passages, a control member disposed in said valve passage and having an elongated slot therein, said T-head being seated in said slot and being disposed transversely thereof, and means for preventing rotation, and consequent escape of said T-head from said slot, said last named means comprising an operative connection between said control member and said piston.

AUGUST V. NIELSEN.